US011872782B2

(12) United States Patent
Vaniglia et al.

(10) Patent No.: US 11,872,782 B2
(45) Date of Patent: Jan. 16, 2024

(54) METHOD FOR BUILDING TYRES AND TRANSFER DEVICE OF AN APPARATUS FOR BUILDING TYRES FOR VEHICLE WHEELS

(71) Applicant: Pirelli Tyre S.p.A., Milan (IT)

(72) Inventors: Erika Vaniglia, Milan (IT); Stefano Boracco, Milan (IT); Marco Fabbretti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 18/156,257

(22) Filed: Jan. 18, 2023

(65) Prior Publication Data

US 2023/0158763 A1    May 25, 2023

Related U.S. Application Data

(63) Continuation of application No. 16/765,700, filed as application No. PCT/IB2018/059204 on Nov. 22, 2018, now Pat. No. 11,584,099.

(30) Foreign Application Priority Data

Nov. 27, 2017    (IT) .................. 102017000135957

(51) Int. Cl.
*B29D 30/26* (2006.01)
*B29D 30/00* (2006.01)

(52) U.S. Cl.
CPC ..... *B29D 30/2607* (2013.01); *B29D 30/0061* (2013.01); *B29D 2030/0066* (2013.01)

(58) Field of Classification Search
USPC ...................................................... 156/111
See application file for complete search history.

(56) References Cited

U.S. PATENT DOCUMENTS

2011/0108187 A1    5/2011    Gianni et al.
2011/0126962 A1    6/2011    Mancini et al.
(Continued)

FOREIGN PATENT DOCUMENTS

CN    102046360 A    5/2011
CN    102712155 A    10/2012
(Continued)

OTHER PUBLICATIONS

ESpaceNet Translation of JP2012236392 (Year: 2023).*
(Continued)

*Primary Examiner* — Katelyn W Smith
*Assistant Examiner* — Alexander D Booth
(74) *Attorney, Agent, or Firm* — Finnegan, Henderson, Farabow, Garrett & Dunner, L.L.P.

(57)    ABSTRACT

The present invention is relative to a method for building tyres for vehicle wheels and to a transfer device (16) of an apparatus for building tyres for vehicle wheels. The centring device (16) comprises: an annular support structure (18); gripping elements (19) arranged as a ring on the annular support structure (18) and having gripping surfaces (20) directed radially towards a longitudinal axis (Z-Z) of the transfer device (16); a measurement device (30) mounted on the annular support structure (18). The measurement device (30) is configured for detecting the centring between the transfer device (16) and a drum (12, 13) situated within the transfer device (16). The transfer device (16) is configured for picking up the tyre being processed (14, 15) from the drum (12, 13) on which the tyre being processed is arranged or for depositing a tyre being processed (14, 15) on the drum (12, 13).

8 Claims, 5 Drawing Sheets

(56) References Cited

U.S. PATENT DOCUMENTS

| | | |
|---|---|---|
| 2012/0318458 A1 | 12/2012 | Araki |
| 2013/0169974 A1 | 7/2013 | Iwayama |
| 2015/0158261 A1 | 6/2015 | Mancini et al. |
| 2015/0321432 A1 | 11/2015 | Mancini et al. |
| 2017/0074645 A1 | 3/2017 | Nakano |

FOREIGN PATENT DOCUMENTS

| | | | | |
|---|---|---|---|---|
| EP | 2527132 A1 | | 11/2012 | |
| EP | 2613122 A1 | | 7/2013 | |
| EP | 3153815 A1 | | 4/2017 | |
| JP | H0752277 A | * | 2/1995 | ......... B29D 30/2607 |
| JP | 2012-236392 | | 12/2012 | |
| WO | WO 2009/128046 A1 | | 10/2009 | |
| WO | WO 2010/013553 A1 | | 2/2010 | |
| WO | WO 2010/064077 A1 | | 6/2010 | |
| WO | WO 2011/086783 A1 | | 7/2011 | |
| WO | WO 2013/083086 A1 | | 6/2013 | |

OTHER PUBLICATIONS

Suzuki. JPH0752277. machine translated. <1993>. (Year: 2023).*
International Search Report form the European Patent Office in corresponding International Application No. PCT/IB2018/059204 dated Feb. 25, 2019.
Written Opinion of the International Searching Authority from the European Patent Office in corresponding International Application No. PCT/IB2018/059204 dated Feb. 25, 2019.
First Office Action dated Oct. 11, 2021, from the State Intellectual Property Office of People's Republic of China in counterpart Chinese Application No. 201880076519.4.

* cited by examiner

METHOD FOR BUILDING TYRES AND TRANSFER DEVICE OF AN APPARATUS FOR BUILDING TYRES FOR VEHICLE WHEELS

This application is a continuation application of U.S. application Ser. No. 16/765,700, filed on May 20, 2020, which is a national stage entry application under 35 U.S.C. § 371 based on International Application No. PCT/IB2018/059204, filed Nov. 22, 2018, and claims priority to Italian Patent Application No. 102017000135957, filed Nov. 27, 2017; the contents of each application is incorporated herein by reference.

TECHNICAL FIELD OF THE INVENTION

The object of the present invention is a method for building tyres and a transfer device of an apparatus for building tyres for vehicle wheels.

The present invention is situated in the scope of processes and apparatuses for building tyres for vehicle wheels.

In particular, the present invention is situated in the scope of methods and devices adapted, during the building of a tyre, to control and verify the correct arrangement and the correct assembly on a drum of components intended to form the green tyre.

A tyre for vehicle wheels generally comprises a carcass structure comprising at least one carcass ply having end flaps engaged with respective anchoring annular structures. In radially external position with respect to the carcass structure, a belt structure is associated thereto, comprising one or more belt layers, situated in radial superimposition on each other and with respect to the carcass ply, having textile or metallic reinforcement cords with cross orientation and/or substantially parallel to the circumferential extension direction of the tyre. In radially external position with respect to the belt structure, a tread band is applied, it too made of elastomeric material like other constituent semi-finished products of the tyre. The assembly of at least said belt structure and of said tread band form the crown structure of the tyre. Respective sidewalls made of elastomeric material are also applied on the lateral surfaces of the carcass structure, each extended from one of the lateral edges of the tread band up to the respective anchoring annular structure to the beads. In the tyres of "tubeless" type, the carcass ply is internally covered by a layer of elastomeric material, preferably with butyl base, normally termed "liner" having optimal characteristics of air impermeability and extended from one of the beads to the other.

The production cycles of a tyre provide for a building process in which the various structural components of the tyre itself are made and/or assembled on one or more drums.

The built green tyres are transferred into a moulding and vulcanisation line where a process of moulding and vulcanisation is actuated that is adapted to define the structure of the tyre according to a desired geometry and tread design.

Definitions

With the term "elastomeric material" it is intended to indicate a composition comprising at least one elastomeric polymer and at least one reinforcement filler. Preferably, such composition also comprises additives such as, for example, a cross-linking agent and/or a plasticising agent. Due to the presence of the cross-linking agent, through heating, such material can be cross-linked, so as to form the final manufactured product.

By "component" or "structural component" of a tyre it is intended any one portion thereof capable of performing its own function or a part thereof. The following are for example components of the tyre: the liner, the under-liner, the sidewall inserts, the bead cores, the filler inserts, the anti-abrasive element, the sidewalls, the carcass ply/plies, the belt layer(s), the tread band, the underlayer of the tread band, the under-belt inserts etc., or a part thereof.

By "tyre being processed" it is intended at least one component or structural component of the tyre deposited on a drum.

The terms "radial" and "axial" and the expressions "radially internal/external" and "axially internal/external" are used by making reference respectively to a direction perpendicular and to a direction parallel to a rotation axis of the tyre/tyre being processed, and/or of a drum.

A plane is defined "radial" when it comprises the rotation axis of the tyre/tyre being processed and/or of a drum.

The term "symmetry plane of the tyre/tyre being processed" indicates the symmetry plane orthogonal to the rotation axis of the tyre/tyre being processed.

The terms "circumferential" and "circumferentially" are instead used by making reference to the direction of the annular extension of the tyre/tyre being processed.

By "centre of a tyre/tyre being processed" it is intended the intersection point between the rotation axis and the symmetry plane of the tyre/tyre being processed.

By "middle line plane of a drum" it is intended the plane orthogonal to the rotation axis of the drum and which divides the drum into two halves.

By "centre of a drum" it is intended the intersection point between the rotation axis and the middle line plane of the drum.

By "longitudinal axis of a transfer device" it is intended the straight axis of the cylinder inscribed between the gripping surfaces of the transfer device at least in gripping conditions.

With regard to the transfer device, a plane is defined "radial" when it comprises the aforesaid longitudinal axis.

By "middle line plane of a transfer device" it is intended the plane orthogonal to the longitudinal axis of the transfer device and which divides the transfer device in half.

By "centre of the transfer device" it is intended the intersection point between the longitudinal axis and the middle line plane of the transfer device.

By "longitudinal centring" of a tyre being processed with respect to a transfer device it is intended the correspondence between the centre of the tyre being processed and the centre of the transfer device.

By "longitudinal centring" of a drum with respect to a transfer device it is intended the correspondence between the centre of the drum and the centre of the transfer device.

By "coaxiality" between a tyre being processed and a transfer device it is intended that the longitudinal axis of the transfer device coincides with the rotation axis of the tyre being processed, i.e. said axes are not tilted with respect to each other and/or laterally offset with respect to each other.

By "coaxiality" between a drum and a transfer device it is intended that the longitudinal axis of the transfer device coincides with the rotation axis of the drum, i.e. said axes are not tilted with respect to each other and/or laterally offset with respect to each other.

Generally it follows that a transfer device and a tyre being processed (or the transfer device and a drum) can be coaxial and longitudinally centred, coaxial but not longitudinally centred, longitudinally centred but not coaxial.

State of the Art

The document WO2009128046, in the name of the same Applicant, illustrates an assembly station in which a carcass sleeve and an external sleeve made in respective building lines are mutually coupled. The assembly station integrates engagement devices alternatively couplable with an auxiliary drum carrying an external sleeve and with a building drum carrying a carcass sleeve. A gripping unit picks up the external sleeve from the auxiliary drum coupled to the engagement devices, in order to position it around the carcass sleeve carried by the building drum. Shaping devices operatively couplable with the building drum cause a radial expansion of the carcass sleeve so as to couple it to the external sleeve retained by the gripping unit.

The document JP2012236392A illustrates a transfer device used for picking up a tread ring from a forming drum and transporting it into an application position, in which such tread ring is applied to the exterior of a base element of a green tyre carried by a shaping drum. The transfer device allows evaluating non-alignments between said transfer device and the shaping drum through a first laser distance sensor and a second laser distance sensor mounted on a support ring of the transfer device. The first and the second sensor measure the distance, respectively, along X and along Y, from a support shaft of the shaping drum.

SUMMARY

The Applicant has perceived the need to improve the quality of the produced tyres and to ensure greater conformity thereof with the design specifications, in particular of the tyres whose components are obtained through application of semi-finished products on one or more drums carried and moved by movement devices with multiple degrees of freedom configured for moving the drums in the three-dimensional space, such as for example multi-axis robots, preferably but not necessarily anthropomorphic robots.

The Applicant has in fact observed that such known movement devices with multiple degrees of freedom are sometimes not able to ensure the precision and repeatability of positioning of the tyre being processed, necessary for optimising the quality of the built tyres and hence their performances.

The Applicant has in particular observed that such movement devices with multiple degrees of freedom do not allow ensuring the abovementioned precision and repeatability of positioning between elements of the tyre during the building.

The Applicant has observed that such errors of positioning generate defects and non-uniformities on the built tyres. The errors of positioning can also generate performance variability between one tyre and the next.

The defects, non-uniformities and the variability are often not visible on the finished tyre but can only be seen through dynamic tests.

Such defects, non-uniformities and variability finally affect the performances that the produced tyres are able to offer.

The Applicant has perceived that the abovementioned defects and non-uniformities derive in particular from errors of centring between a transfer device and the tyre being processed, in which the transfer device is configured for engaging and retaining the tyre being processed at a radially external portion thereof, for the purpose of picking up the tyre being processed from a drum on which said tyre being processed is arranged or for the purpose of associating a tyre being processed with a drum, it too carrying a tyre being processed.

The Applicant has observed that various factors can intervene that compromise the mutual positioning of the transfer device and of the tyre being processed which are, especially but not exclusively, ascribable to the abovementioned movement devices. Among the causes leading to the abovementioned positioning variability, the following can be mentioned: resetting when there is a failure of the apparatus; incorrect alignment activities during implementation of the apparatus; intrinsic variability of the instruments; structural yielding and/or wear of the components of the apparatus.

The Applicant observes that the laser sensors illustrated in the document JP2012236392A are unable to detect, with the necessary precision, the coaxiality between the transfer device thereof and the shaping drum thereof and more precisely they are not at all able to detect the longitudinal centring between the transfer device thereof and the shaping drum thereof.

The Applicant further observes that the document JP2012236392A does not even show the need for an extremely precise control system capable of detecting coaxiality and longitudinal centring, since the drums thereof substantially can only rotate with respect to the fixed devices that support them and the transfer device illustrated in the aforesaid document can only translate along a fixed rail.

The Applicant has perceived that in order to solve the abovementioned problems, the transfer device can be used as a reference for checking the position of the tyres being processed and/or of the drums on which the tyres being processed are to be deposited or from which the tyres being processed are to be picked up.

The Applicant has finally found that the transfer device can be used for checking the longitudinal centring between the tyre being processed and the transfer device.

According to a first aspect, the present invention regards a method for building tyres for vehicle wheels.

Preferably, provision is made for arranging a tyre being processed carried by a drum in a radially internal position with respect to gripping elements of a transfer device; the gripping elements having gripping surfaces directed radially towards a longitudinal axis of the transfer device; the drum being supported by a movement device with at least two degrees of freedom.

Preferably, provision is made for detecting, through a measurement device, a longitudinal shift, along a direction parallel to said longitudinal axis of the transfer device, between a centre of the transfer device and a centre of the tyre being processed.

The Applicant deems that the present invention also allows remedying the intrinsic imprecisions connected to the use of movement devices with multiple degrees of freedom, in order to obtain tyres which precisely reflect the design specifications.

The Applicant also deems that the present invention allows controlling possible variations and drifts that can occur during production of a batch of tyres, so as to limit them and/or oppose them.

In accordance with a second aspect, the present invention regards a transfer device of an apparatus for building tyres for vehicle wheels. Preferably the following are provided: an annular support structure; gripping elements arranged as a ring on the annular support structure and having gripping surfaces directed radially towards a longitudinal axis of the transfer device.

Preferably, the gripping elements are configured for being arranged around a drum carrying a tyre being processed.

Preferably, the drum is carried by a movement device with at least two degrees of freedom.

Preferably, a measurement device is provided, mounted on the annular support structure.

Preferably, the measurement device is configured for detecting a longitudinal shift, along a direction parallel to the longitudinal axis of the transfer device, between a centre of the transfer device and a centre of the drum.

According to a further aspect, the present invention also regards an apparatus for building tyres for vehicle wheels.

Preferably, a forming drum is provided, configured for bringing a carcass structure.

Preferably, an auxiliary drum is provided, configured for bringing a crown structure.

Preferably, a movement device is provided with at least two degrees of freedom configured for supporting the forming drum.

Preferably, an auxiliary movement device is provided with at least two degrees of freedom configured for supporting the auxiliary drum. Preferably, a transfer device is provided in accordance with the aforesaid second aspect.

Preferably, the movement device is movable between a first position in which the forming drum is in a radially internal position with respect to the gripping elements of the transfer device and a second position in which the forming drum is outside the transfer device.

Preferably, the auxiliary movement device is movable between a first position in which the auxiliary drum is in a radially internal position with respect to the gripping elements of the transfer device and a second position in which the auxiliary drum is outside the transfer device.

The Applicant further deems that the present invention allows avoiding having to very frequently re-align the apparatus, with consequent waste of time to the detriment of productivity and in any case without having the certainty that every single produced tyre was obtained with the best possible alignment.

The present invention, in at least one of the aforesaid aspects, can have one or more of the preferred characteristics which are described hereinbelow.

Preferably, detecting the longitudinal shift comprises: measuring a longitudinal distance, parallel to the longitudinal axis, between a lateral portion of the transfer device and a longitudinal end of the drum and calculating the longitudinal shift starting from said longitudinal distance. This measurement type is relatively simple, since the longitudinal end of the drum projects laterally from the transfer device and can be operatively reached by the measurement device.

Preferably, measuring the longitudinal distance comprises: sighting the longitudinal end of the drum through a sensor of the measurement device mounted on the lateral portion of the transfer device.

The abovementioned sensor is easily installable on the transfer device, making use of the space on the sides thereof.

Preferably, sighting comprises: generating a laminar beam of electromagnetic waves lying in a radial plane of the transfer device and configured for at least partially hitting the longitudinal end of the drum. Preferably, the laminar beam is diametral.

Preferably, the laminar beam is a beam of laser light.

The laminar beam partly or totally hits the longitudinal end of the drum, hence partly or completely intercepting the surface of the drum. As a function of the portion of the laminar beam intercepted, the sensor through electronics associated therewith is capable of providing a value correlated to a longitudinal position of the drum, and of the tyre being processed arranged thereon, with respect to the transfer device. The measurement is made without bringing mechanical parts in contact and hence is safe as well as precise.

Preferably, provision is also made for detecting a relative position between the longitudinal axis of the transfer device and a rotation axis of the tyre being processed.

In addition to the longitudinal centring, it is possible to further reduce defects and non-uniformities by checking the coaxiality between the transfer device and the tyre being processed.

Preferably, detecting the relative position comprises: detecting a relative position between the longitudinal axis of the transfer device and a rotation axis of the drum.

Since the tyre being processed is picked up from the drum or is applied on the drum (with respect to which it is coaxial), it is simpler to check the coaxiality between the transfer device and the drum.

Preferably, the relative position between the longitudinal axis of the transfer device and the rotation axis of the drum is detected by measuring radial distances between the transfer device and a radially external surface of the drum.

Preferably, said relative position is detected by calculating, starting from said radial distances, a position of the rotation axis of the drum with respect to a reference system integral with the transfer device. Since the dimensions of the drum and those of the transfer device are known, the abovementioned radial distances allow finding the position of the rotation axis of the drum.

Preferably, the radial distances are detected at opposite longitudinal ends of the drum.

Said opposite longitudinal ends of the drum project laterally from the transfer device and can be used as a target for measuring the radial distances. In this manner, it is possible to detect the positions of the two opposite longitudinal ends of the drum and, since the geometry of the drum is known, obtain the position of the rotation axis thereof with respect to the transfer device.

Preferably, the radially external surface of the drum is a deposition surface.

In other words, said radially external surface is that surface on which the tyre being processed lies; the radial distances are detected at the radially external surfaces of the opposite longitudinal ends of the drum which project laterally (along a longitudinal direction).

Preferably, the radially external surface of the drum is a surface of a shaft projecting longitudinally with respect to the deposition surface.

In other words, said radially external surface belongs to a shaft which is part of the drum and which projects laterally (along a longitudinal direction) from the deposition surface.

Preferably, the radial distances are measured on a first plane and on a second plane, in which said first plane and second plane are placed on opposite sides with respect to a middle line plane of the transfer device. Preferably, detecting the relative position comprises: calculating, for each of the longitudinal ends, a respective first centre lying on the first plane and a respective second centre lying on the second plane; in which the rotation axis of the drum passes through said first and second centres.

Preferably, said first plane and second plane are symmetric with respect to the middle line plane of the transfer device.

Since the coordinates are known, in a reference system that is fixed with respect to the transfer device, of the abovementioned first and second centres belonging to the rotation axis of the drum, the position of the rotation axis is also known with respect to the longitudinal axis of the transfer device. The abovementioned two axes can be: coinciding, parallel and spaced from each other, tilted with respect to each other and intersecting, tilted and spaced (oblique).

Preferably, the radial distances are detected through a first group of distance sensors, mounted on a first of two longitudinally opposite lateral portions of the transfer device.

Preferably, the radial distances are detected through a second group of distance sensors, mounted on a second of the two longitudinally opposite lateral portions of the transfer device.

The abovementioned distance sensors are easily installable on the transfer device by making use of the spaces on the sides thereof. These are also easily reachable, for example in order to be able to perform operations of maintenance, substitution, calibration, etc.

Preferably, detecting the radial distances comprises emitting electromagnetic radiation beams and capturing corresponding reflected beams.

Preferably, the electromagnetic radiation beams are laser light beams. The measurement is made without bringing mechanical parts in contact and is therefore safe as well as precise.

Preferably, the emitted and reflected beams are at least two for each of the two lateral portions.

Preferably, the emitted and reflected beams are at least three for each of the two lateral portions.

Preferably, the emitted and reflected beams are at least four for each of the two lateral portions.

Preferably, the movement device has at least six degrees of freedom. Preferably, the movement device with at least six degrees of freedom is a multi-axis robot.

Preferably, the movement device with at least six degrees of freedom is an anthropomorphic robot with at least six axes.

Preferably, the movement device is configured for being coupled with a central portion of the drum placed at an axial end of the drum, so as to projectingly support said drum.

The multi-axis robots can be programmed for managing a wide range of tyres sizes and hence of drums and of structures of the tyres to be built.

Preferably, the tyre being processed is a carcass structure and the drum is a forming drum.

The checking of the centring is carried out between the carcass drum which carries the carcass structure and the transfer device that carries the crown structure before associating the carcass structure and the crown structure together, so as to obtain a coaxial centred coupling. Preferably, the tyre being processed is a crown structure and the drum is an auxiliary drum.

The checking of the centring is carried out between the auxiliary drum that carries the crown structure and the transfer device before the latter picks up the crown structure from the auxiliary drum, so as to obtain perfectly coaxial centred coupling between the crown structure and the transfer device and then the subsequent coaxial centred coupling between the carcass structure and the crown structure.

Preferably, provision is made for generating a first warning signal if the longitudinal shift exceeds a first threshold of longitudinal shift and, preferably, provision is made for generating a first alarm signal if the longitudinal shift exceeds a second threshold of longitudinal shift, greater than the first.

Preferably, the first threshold of longitudinal shift is +/−2 mm. Preferably, the second threshold of longitudinal shift is +/−3 mm. Preferably, checking the coaxiality comprises evaluating a non-coaxiality.

Preferably, the non-coaxiality is calculated as a function of the position of the first centre with respect to an intersection point of the longitudinal axis of the transfer device with the first plane.

Preferably, the non-coaxiality is calculated as a function of the position of the second centre with respect to an intersection point of the longitudinal axis of the transfer device with the second plane.

Preferably, the non-coaxiality is a function of a first radius of a circle with centre in the intersection point of the longitudinal axis of the transfer device with the first plane and passing through the first centre. Preferably, the non-coaxiality is a function of a second radius of a circle with centre in the intersection point of the longitudinal axis of the transfer device with the second plane and passing through the second centre.

Preferably, provision is made for generating a second warning signal if the first radius and/or the second radius exceeds/exceed a first non-coaxiality threshold and, preferably, for generating a second alarm signal if the first radius and/or the second radius exceeds/exceed a second threshold of non-coaxiality, greater than the first.

Preferably, the first threshold of non-coaxiality is +/−1 mm.

Preferably, the second threshold of non-coaxiality is +/−2 mm.

Preferably, provision is made for: feedback controlling the movement device as a function of the longitudinal shift until the transfer device is longitudinally centred with respect to the tyre being processed, carried by drum.

The invention therefore allows correcting possible errors of mutual positioning (longitudinal centring and/or coaxiality) through a dynamic feedback control on the movement device, in particular even if the latter is a multi-axis anthropomorphic robot.

Preferably, provision is made for resetting the reference coordinates of the movement device as a function of errors of mutual positioning (longitudinal centring and/or coaxiality).

Preferably, feedback controlling comprises bringing the longitudinal shift below a reference longitudinal shift.

Preferably, the reference longitudinal shift is 1 mm.

Preferably, feedback controlling comprises: cancelling the longitudinal shift.

In this manner, one obtains the longitudinal centring, i.e. the centre of the transfer device substantially coincides with the centre of the drum and of the tyre being processed.

Preferably, feedback controlling comprises: making the longitudinal axis of the transfer device coincide with the rotation axis of the tyre being processed.

Preferably, feedback controlling comprises: bringing the first radius and/or the second radius below a reference radius.

Preferably, the reference radius is 0.5 mm.

Preferably, feedback controlling comprises: cancelling the first radius and/or the second radius.

In this manner, the coaxiality is obtained, i.e. the rotation axis of the drum and of the tyre being processed substantially coincides with the longitudinal axis of the transfer device.

Preferably, provision is made for recording errors of centring (in terms of coaxiality and/or longitudinal centring), relative to subsequent assemblies of tyres, between the transfer device and the drum. Preferably, provision is made for recording the longitudinal shift, the first radius and the second radius relative to subsequent building of tyres.

This historical data will serve for the evaluation of the progressive course of the errors and for their correlation with data relative to the uniformity of the produced tyres.

Preferably, the measurement device comprises a sensor mounted on the annular support structure; wherein the sensor is configured for measuring a longitudinal distance, parallel to the longitudinal axis, between the lateral portion of the transfer device and a longitudinal end of the drum.

Preferably, the sensor is mounted on a lateral portion of the annular support structure.

Preferably, the sensor is sensitive to electromagnetic waves, more preferably is sensitive to laser light.

Preferably, the sensor comprises an emitter and a receiver situated in diametrically opposite positions of the annular support structure, wherein the sensor is configured for generating a beam of electromagnetic waves, preferably a beam of laser light, extended between the emitter and the receiver.

In other words, the sensor is mounted on the transfer device and is preferably fixed with respect to the annular support structure.

The sensor is of a type known with the term "laser edge sensor", e.g. like the laser micrometer IG-028 KEYENCE™.

Preferably, the measurement device comprises at least one first group of distance sensors mounted on the annular support structure and configured for measuring radial distances from a radially external surface of the drum.

Preferably, the measurement device comprises a first group of distance sensors, mounted on a first of two longitudinally opposite lateral portions of the annular support structure, and a second group of distance sensors, mounted on a second of the two longitudinally opposite lateral portions of the annular support structure.

The groups of distance sensors are mounted on the transfer device and are preferably fixed with respect to the annular support structure. Preferably, each group of distance sensors comprises at least two distance sensors, preferably three distance sensors, preferably four distance sensors, angularly spaced from each other.

Preferably, the distance sensors of each group are angularly equidistant from each other. For example, there are three distance sensors arranged at 120° from each other, or four at 90°.

Preferably, the first and the second group of distance sensors are situated on planes symmetric with respect to a middle line plane of the transfer device.

Preferably, the distance sensors are sensitive to electromagnetic waves, preferably to laser light. The sensors are for example of the series LK-G400 of KEYENCE™.

Preferably, each of the distance sensors comprises an emitter and a receiver side-by-side each other.

Preferably, the auxiliary drum comprises a plurality of sectors consecutively arranged around the rotation axis thereof and defining the deposition surface, in which the distance sensors detect the distance from said sectors.

Preferably, the forming drum comprises a shaft configured for being connected by the movement device, in which the distance sensors detect the distance from said shaft.

Preferably, the apparatus comprises a control unit operatively connected to the measurement device and to the auxiliary movement device, in which the control unit is programmed for:
receiving, from the measurement device, an auxiliary signal relative to a longitudinal shift of the auxiliary drum,
calculating, from said auxiliary signal, a first error of longitudinal centring of the auxiliary drum with respect to the transfer device,
feedback controlling the position of the auxiliary movement device, so as to longitudinally centre the auxiliary drum with respect to the transfer device.

Preferably, the control unit is operatively connected to the movement device and is programmed for:
receiving, from the measurement device, a signal relative to a longitudinal shift of the forming drum,
calculating, from said signal, a second error of longitudinal centring of the forming drum with respect to the transfer device,
feedback controlling the position of the movement device, so as to longitudinally centre the forming drum with respect to the transfer device.

Preferably, the control unit is programmed for:
receiving, from the measurement device, distance signals relative to radial distances from the auxiliary drum,
calculating from said distance signals the position of the rotation axis of the auxiliary drum,
feedback controlling the position of the auxiliary movement device, so as to render the auxiliary drum and the transfer device coaxial.

Preferably, the control unit is programmed for:
receiving, from the measurement device, distance signals relative to radial distances from the forming drum,
calculating from said distance signals the position of the rotation axis of the forming drum,
feedback controlling the position of the movement device, so as to render the forming drum and the transfer device coaxial.

Further characteristics and advantages will be clearer from the detailed description of preferred but not exclusive embodiments of a method for building tyres and of a transfer device according to the present invention.

DESCRIPTION OF THE DRAWINGS

Such description will be set forth hereinbelow with reference to the enclosed drawings, provided only as a non-limiting example, in which.

DETAILED DESCRIPTION

Figure 1:
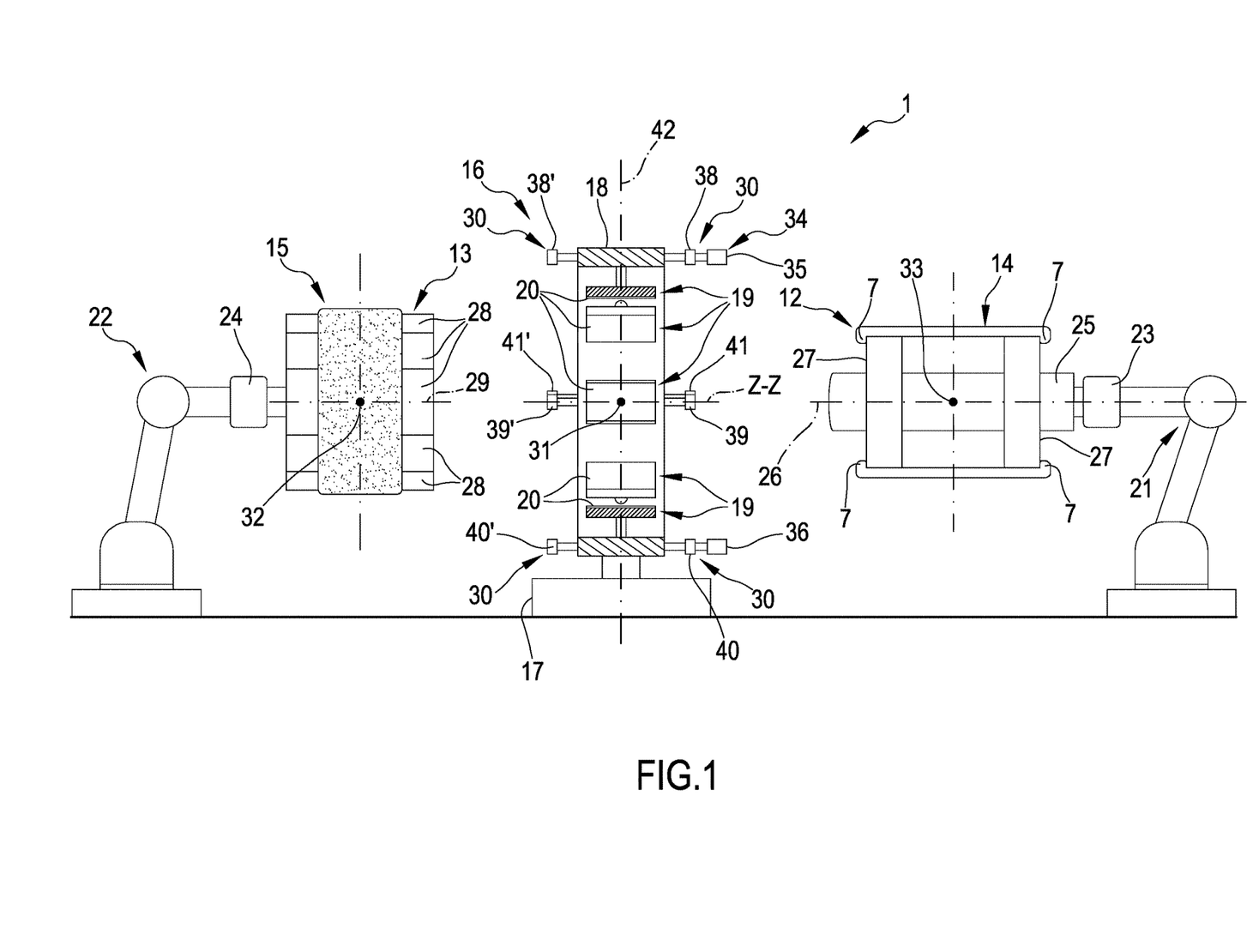
FIG. 1 schematically shows an assembly station of a plant for manufacturing tyres for vehicle wheels.

With reference to FIG. 1, reference number 1 overall indicates an assembly station of an apparatus for building green tyres in turn part of a plant, not illustrated in its entirety, for making tyres for vehicle wheels.

Figure 6:
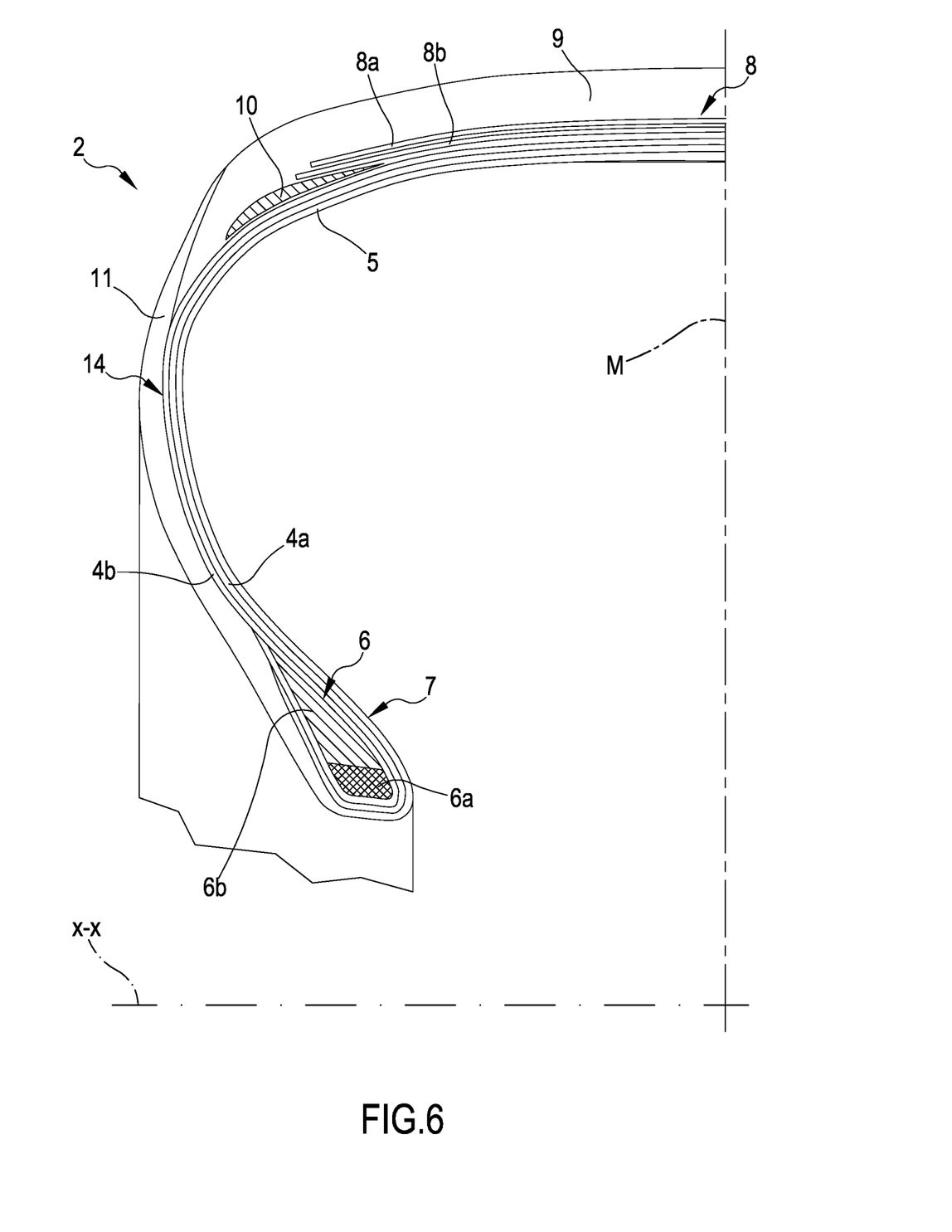
FIG. 6 is a radial half-section of a tyre assembled in the assembly station of FIG. 1.

A tyre 2, made in said plant and assembled in the assembly station 1, is illustrated in FIG. 6 and essentially comprises a carcass structure 14 having two carcass plies 4a, 4b. An impermeable layer of elastomeric material or so-called liner 5 is applied inside the carcass ply/plies 4a, 4b. Two anchoring annular structures 6, each comprising a so-called bead core 6a carrying an elastomeric filler 6b in radially external position, are engaged with respective end flaps of the carcass ply/plies 4a, 4b. The anchoring annular structures 6 are integrated in proximity to zones normally identified with the name "beads" 7, at which the engagement between the tyre 2 and a respective mounting rim usually occurs. A belt structure 8 comprising belt layers 8a, 8b is circumferentially applied around the carcass plies 4a, 4b, and a tread band 9 is circumferentially superimposed on the belt structure 8. The belt structure 8 can be associated with so-called "under-belt inserts" 10 each situated between the carcass plies 4a, 4b and one of the axially opposite terminal edges of the belt structure 8. Two sidewalls 11, each extended from the corresponding bead 7 to a corresponding lateral edge of the tread band 9, are applied in laterally opposite positions on the carcass plies 4a, 4b. The portion of each sidewall 11 proximal to the lateral edge of the tread band 9 is known as the shoulder of the tyre. The tyre 2 has a middle line plane "M" (FIG. 6) equidistant from the respective beads 7 and perpendicular to the main rotation axis "X-X" thereof, when the tyre is operating.

The plant, not illustrated in detail, comprises a tyre production line formed by the apparatus for building green tyres and by at least one moulding and vulcanisation unit operatively arranged downstream of the building apparatus.

In one embodiment, the apparatus for building green tyres comprises a carcass building line, at which forming drums 12 are moved between different semi-finished product dispensing stations arranged to form, on each forming drum 12, a carcass structure 14 comprising the carcass plies 4a, 4b, the liner 5, the anchoring annular structures 6 and possibly at least one part of the sidewalls 11.

Simultaneously, in a crown building line, one or more auxiliary drums 13 are sequentially moved between different work stations arranged to form, on each auxiliary drum 13, a crown structure 15, comprising at least the belt structure 8, the tread band 9, and possibly at least one part of the sidewalls 11.

In the abovementioned assembly station 1, the crown structure 15 is coupled to the carcass structure 14.

Figure 2:
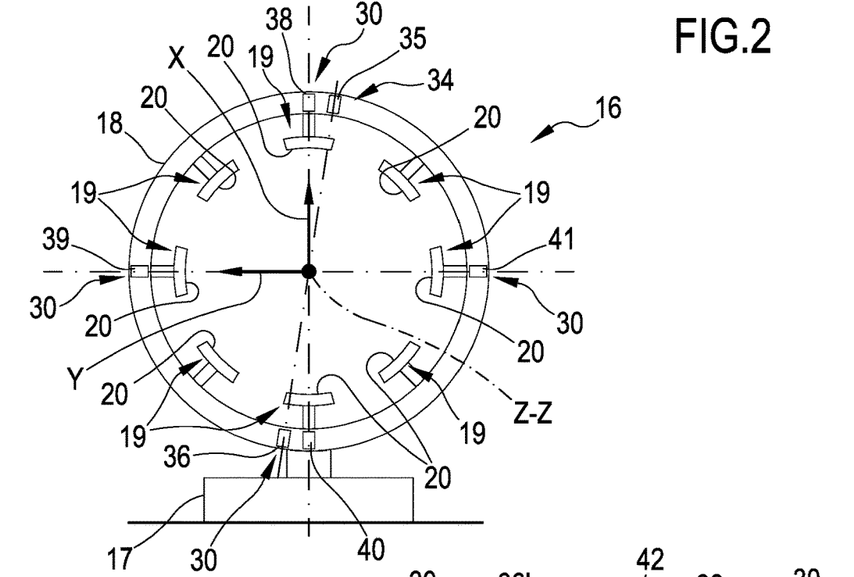
FIG. 2 is a side view of a transfer device belonging to the assembly station of FIG. 1.

The assembly station 1 comprises a transfer device 16 comprising a base 17 fixed on the ground and an annular support structure 18 mounted on the base 17. The annular support structure 18 carries, at a radially internal portion thereof, a plurality of gripping elements 19 arranged as a ring and having gripping surfaces 20 directed radially towards a longitudinal axis "Z-Z" of the annular support structure 18 and of the transfer device 16. The longitudinal axis "Z-Z" is preferably horizontal.

In a per se known manner and therefore not described in detail, the gripping elements 19, through non-illustrated actuators operatively arranged between each of the gripping elements 19 and the annular support structure 18, are movable along radial directions and with respect to the annular support structure 18 between a first configuration and a second configuration. In the first configuration, the gripping elements 19 are radially more spaced from the longitudinal axis "Z-Z" and circumferentially more spaced from each other than in the second configuration, in which they lie closer to said longitudinal axis "Z-Z" and are closer to each other.

The gripping elements 19 are also provided with needles on the gripping surfaces 20, and by means of the aforesaid needles the gripping elements 19 are capable of retaining a tyre being processed, such as for example the crown structure 15, against the gripping surfaces 20.

The assembly station 1 comprises (FIG. 1) a movement device 21 defined by an anthropomorphic robot with at least six axes and an auxiliary movement device 22, also defined by an anthropomorphic robot with at least six axes, for example arranged on opposite sides of the transfer device 16.

The movement device 21 comprises a terminal end 23 provided with gripping devices configured for coupling or releasing a forming drum 12 carrying the carcass structure 14.

The movement device 21 is therefore capable of supporting and moving the forming drum 12. Due to the movement device 21, each forming drum 12 carried by said movement device 21 has six degrees of freedom and can be spatially oriented as desired. The forming drum 12 with the carcass structure 14 formed in the carcass building line is picked up from the movement device 21 in order to be operatively coupled to the transfer device 16, as will be illustrated hereinbelow.

The auxiliary movement device 22 comprises a terminal end 24 provided with gripping devices configured for coupling or releasing an auxiliary drum 13 carrying the crown structure 15.

The auxiliary movement device 22 is therefore capable of supporting and moving the auxiliary drum 13. Due to the auxiliary movement device 22, each auxiliary drum 13 carried by said auxiliary movement device 22 has six degrees of freedom and can be spatially oriented as desired. The auxiliary drum 13 with the crown structure 15 formed in the crown building line is picked up from the auxiliary movement device 22 so that it too is operatively coupled with the transfer device 16, as will be illustrated hereinbelow.

The forming drum 12 comprises a shaft 25 coaxial with a rotation axis 26 thereof and a pair of semi-drums 27 mounted coaxially on the shaft 25 and movable, due to non-illustrated devices, along a direction parallel to the rotation axis 26, mutually close to or away from each other. The terminal end 23 of the movement device 21 is configured for being coupled with a terminal end of the shaft 25 of the forming drum 12 so as to projectingly support said forming drum 12.

The auxiliary drum 13 comprises a plurality of sectors 28 consecutively arranged around a rotation axis 29 thereof and defining a radially external deposition surface for the crown structure 15. Mechanisms, not illustrated, allow radially moving the sectors 28 in order to move them between a radially expanded configuration and a radially contracted configuration.

The terminal end 24 of the auxiliary movement device 22 is configured for being coupled with a central portion of the auxiliary drum 13 placed at an axial end of the auxiliary drum 13 so as to projectingly support said auxiliary drum 13.

In accordance with the method according to the present invention, in the assembly station 1, while the gripping elements 19 are in the respective first configuration (radially more spaced from the longitudinal axis "Z-Z") and the auxiliary drum 13 is in the radially expanded configuration thereof, the auxiliary movement device 22 carries the auxiliary drum 13 with the crown structure 15 within the transfer device 16, i.e. in a radially internal position with respect to the gripping surfaces 20 of the gripping elements 19. In such position, the gripping elements 19 are arranged around the auxiliary drum 13 and the crown structure 15 and the gripping surfaces 20 are directed radially towards a radially external portion of the crown structure 15.

The gripping elements 19 are partially spaced towards the second configuration until the gripping surfaces 20 are brought into contact with the radially external portion of the crown structure 15. The presence of the aforesaid needles allows making the crown structure 15 integral with the gripping elements 19. At this point, the sectors 28 of the auxiliary drum 13 are moved into the radially contracted configuration and they are decoupled from the crown structure 15, freeing said crown structure 15 which remains supported only by the gripping elements 19 of the transfer device 16. The auxiliary device 22 therefore provides for extracting the auxiliary drum 13 from the transfer device 16 while the crown structure 15 remains on the transfer device 16.

At this point, the movement device 21, which supports the carcass structure 14, carries the forming drum 12 with the carcass structure 14 within the transfer device 16, i.e. in a radially internal position with respect to the crown structure 15 supported by the gripping elements 19. In such position, the crown structure 15 is arranged around the carcass structure 14.

Through the mutual approaching of the two semi-drums 27 of the forming drum 12, which contributes to determining a radial expansion of the carcass structure 14, a radially internal surface of the crown structure 15 is coupled to a radially external surface of the carcass structure 14. The crown structure 15 adheres to the carcass structure 14 and is released by the gripping elements 19.

The movement device 21 can therefore bring the forming drum 12 with the tyre being processed provided with the carcass structure 14 and with the crown structure 15 towards further possible processing stations and/or towards the moulding and vulcanisation unit.

In order to ensure the correct positioning and assembly of the crown structure 15 with the carcass structure 14, the positions of the auxiliary drum 13 with respect to the transfer device 16 during the pick-up of the crown structure 15 and the position of the forming drum 12 with respect to said transfer device 16 during the association of the carcass structure 14 with the crown structure 15 must be well-defined and precise.

In particular, each of the abovementioned forming drum 12 and auxiliary drum 13, in the respective operating steps, must be longitudinally centred and coaxial with respect to the transfer device 16. As already previously indicated, by "longitudinal centring" of a drum with respect to the transfer device 16, it is intended the correspondence between the centre of the drum and the centre of the transfer device 16 and by "coaxiality" between a tyre being processed and the transfer device 16 it is intended that the longitudinal axis "Z-Z" of the transfer device 16 coincides with the rotation axis of the tyre being processed, i.e. said axes are not tilted with respect to each other and/or laterally offset with respect to the other.

In order to check and possibly adjust the centring of the auxiliary drum 13 and of the crown structure 15 with respect to the transfer device 16 when the auxiliary drum 13 and the crown structure 15 are placed within the transfer device 16, the transfer device 16 comprises a measurement device 30 mounted on the annular support structure 18. The same measurement device 30 also serves for checking and possibly adjusting the centring of the forming drum 12 and of the carcass structure 14 with respect to the transfer device 16 when the forming drum 12 and the carcass structure 14 are placed within the transfer device 16.

Since the positioning of the crown structure 15 on the auxiliary drum 13 is precise, i.e. the rotation axis 29 of the auxiliary drum 13 coincides with a rotation axis of the crown structure 15 and a middle line plane of the auxiliary drum coincides with a middle line plane of the crown structure 15, the centring of the crown structure 15 with respect to the transfer device 16 is operated between said transfer device 16 and the auxiliary drum 13.

Analogously, since the positioning of the carcass structure 14 on the forming drum 12 is precise, i.e. the rotation axis 26 of the forming drum 12 coincides with a rotation axis of the carcass structure 14 and a middle line plane of the forming drum 12 coincides with a middle line plane of the carcass structure 14, the centring of the carcass structure 14 with respect to the transfer device 16 is operated between said transfer device 16 and the forming drum 12.

In the illustrated embodiment and in accordance with the method according to the present invention, the measurement device 30 is configured for detecting a longitudinal shift "ΔZ", along a direction parallel to the longitudinal axis "Z-Z", between a centre 31 of the transfer device 16 and a centre 32 of the crown structure 15 and of the auxiliary drum 13 and for detecting the coaxiality between the longitudinal axis "Z-Z" of the transfer device 16 and the rotation axis 29 of the crown structure 15 and of the auxiliary drum 13.

Analogously, the measurement device 30 is configured for detecting a longitudinal shift "ΔZ", along the abovementioned direction parallel to the longitudinal axis "Z-Z", between the centre 31 of the transfer device 16 and a centre 33 of the carcass structure 14 and of the forming drum 12 and for detecting the coaxiality between the longitudinal axis "Z-Z" of the transfer device 16 and the rotation axis 26 of the carcass structure 14 and of the forming drum 12.

The measurement device 30 comprises a sensor 34 mounted on a lateral portion of the annular support structure 18. The sensor 34 is a laser sight sensor (e.g. the laser micrometer IG-028 KEYENCE™) which comprises an emitter 35 and a receiver 36 which are arranged in diametrically opposite positions of the annular support structure 18 and extend laterally with respect to the annular support structure 18. The emitter 35 and the receiver 36 are mutually facing so as to generate a laminar laser beam 37 which is extended between the emitter 35 and the receiver 36 and lies in a radial plane of the transfer device 16, i.e. in a plane where the longitudinal axis "Z-Z" (FIGS. 2 and 3) also lies. The position of the emitter 35 and the receiver 36 is such that the laminar beam 37 emitted by the emitter 35 at least partly hits the radially external deposition surface of the auxiliary drum 13 (formed by the sectors 28) and hence at least in part does not reach the receiver 36. Indeed, the longitudinal ends of the auxiliary drum 13 project from the opposite sides of the transfer device 16.

Figure 3:
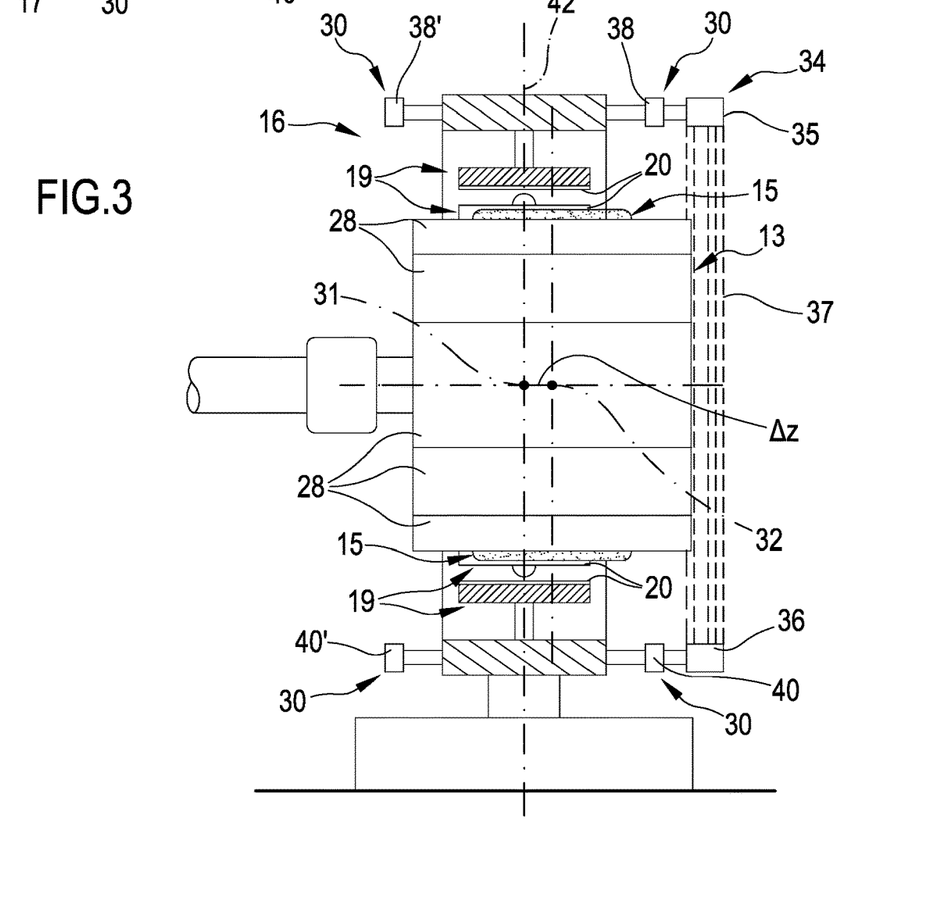
FIG. 3 is a frontal and partially sectional view of the transfer device of FIG. 2 associated with an auxiliary drum in a first position.

As a function of the blocked portion of the laminar beam 37, the sensor 34 through a control unit, not illustrated and operatively connected to the measurement device 30, of the assembly station 1 is able to supply the longitudinal shift "ΔZ" of the auxiliary drum 13 with respect to the transfer device 16, and hence of the crown structure 15 arranged on the auxiliary drum 13 with respect to the transfer device 16 (FIG. 3). In other words, the longitudinal shift "ΔZ" is detected by measuring a longitudinal distance, parallel to the longitudinal axis "Z-Z", between the lateral end of the transfer device 16 and the longitudinal end of the auxiliary drum 13 and calculating the longitudinal shift "ΔZ" starting from said longitudinal distance.

In the same manner, the sensor 34 and the control unit are capable of supplying the longitudinal shift "ΔZ" of the forming drum 12 with respect to the transfer device 16 when the forming drum 12 is situated within the transfer device 16. In such case, the laminar beam 37 emitted by the emitter 35 at least partially hits the longitudinal end of the forming drum 12 or the shaft 25.

The illustrated measurement device 30 also comprises a first group of distance sensors 38, 39, 40, 41 mounted on a first of two longitudinally opposite lateral portions of the annular support structure 18 (on the right in FIG. 1), and a second group of distance sensors 38', 39', 40', 41', mounted on a second of the two longitudinally opposite lateral portions of the annular support structure 18 (on the left in FIG. 1). The function of such distance sensors is that of detecting the coaxiality between the longitudinal axis "Z-Z" of the transfer device 16 and the rotation axis 29 of the crown structure 15 and of the auxiliary drum 13. The abovementioned distance sensors 38, 39, 40, 41, 38', 39', 40', 41' are fixed with respect to the annular support structure 18 when they are operating. Their position can be adjusted in order to calibrate the system.

Figure 4:
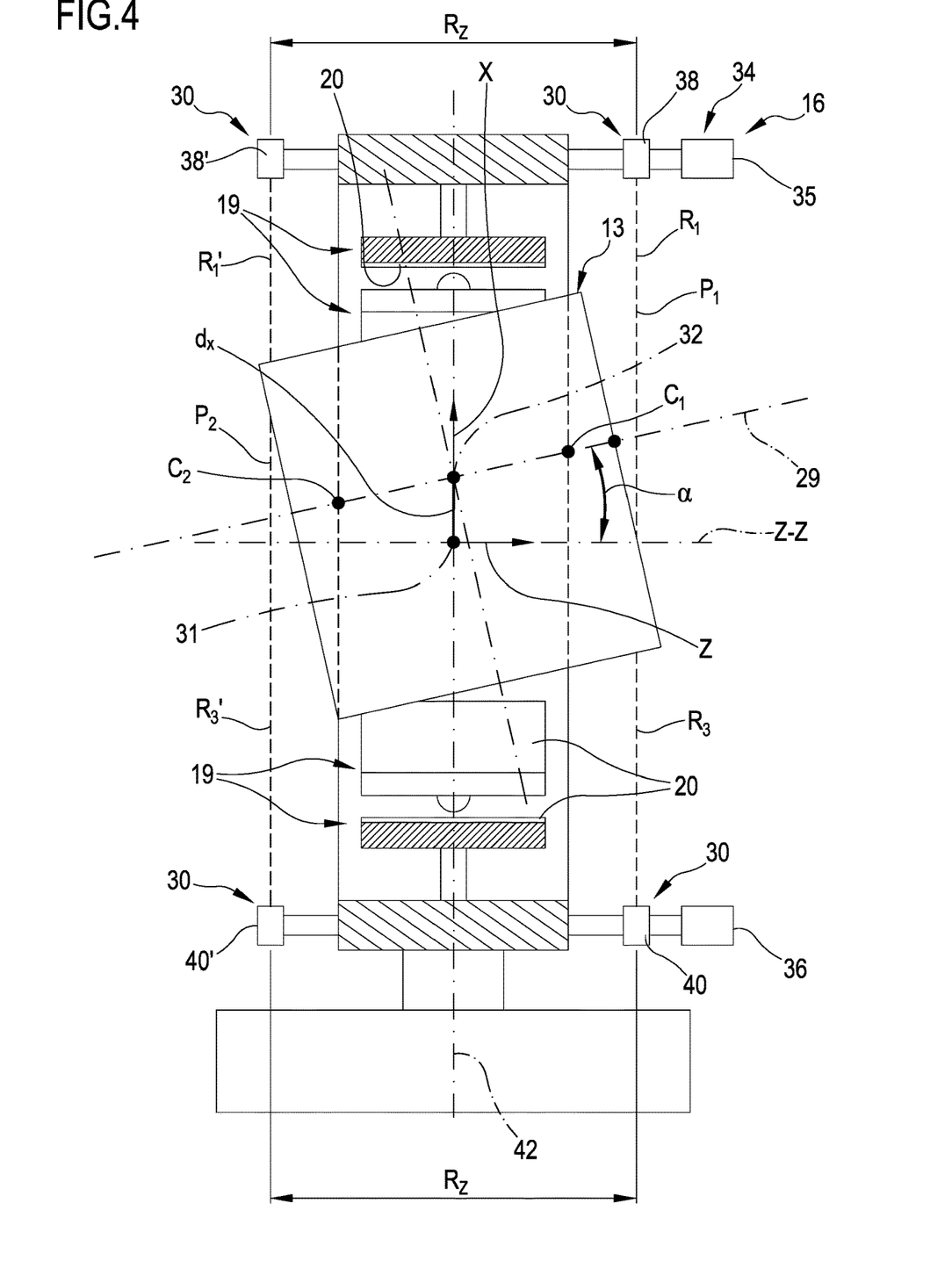
FIG. 4 is a frontal and partially sectional view of the transfer device of FIG. 2 associated with an auxiliary drum in a second position.

For example, but not necessarily, each of the first and second group of distance sensors comprises four distance sensors substantially angularly equidistant from each other. The first and the second group of distance sensors 38, 39, 40, 41, 38', 39', 40', 41' are situated on a first plane P1 and on a second plane P2 which are symmetric with respect to a middle line plane 42 of the transfer device 16 (FIGS. 1, 3 and 4). Each of the distance sensors is of laser type, e.g. of the series LK-G400 of KEYENCE™, and comprises an emitter and a receiver, not illustrated in detail, side-by-side each other. The emitter and the receiver are substantially pointed towards the longitudinal axis "Z-Z" of the transfer device 16.

Each of the distance sensors 38, 39, 40, 41 of the first group measures a respective radial distance R1, R2, R3, R4, on the first plane P1, between said distance sensor and a radially external surface (defined by the sectors 28) of a longitudinal end (that on the right in FIG. 4) of the auxiliary drum 13 (when said auxiliary drum 13 is situated within the transfer device 16).

Each of the distance sensors 38', 39', 40', 41' of the second group measures a respective radial distance $R_1', R_2', R_3', R_4'$, on the second plane P2, between said distance sensor and a radially external surface (always defined by the sectors 28) of the other longitudinal end (that on the left in FIG. 4) of the auxiliary drum 13.

In FIG. 4, the first plane P1 and the second plane P2 are perpendicular to the plane of the drawing, parallel and symmetric to the middle line plane 42 of the transfer device 16.

Since the opposite longitudinal ends of the auxiliary drum 13 project laterally from the transfer device 16, these are used as a target for measuring the radial distances. The radial distances are detected at the radially external surfaces of the opposite longitudinal ends of the auxiliary drum 13 which project laterally (along a longitudinal direction) beyond end edges of the crown structure 15 wound on the auxiliary drum 13.

The laser beam emitted by the emitter of each distance sensor 38, 39, 40, 41, 38', 39', 40', 41' hits the auxiliary drum 13, is reflected and then captured by the respective receiver of the same distance sensor 38, 39, 40, 41, 38', 39', 40', 41'.

Starting from said measured radial distances, R1, R2, R3, R4, $R_1', R_2', R_3', R_4'$, the control unit calculates the position of the rotation axis 29 of the auxiliary drum 13 with respect to a reference system integral with the transfer device 16 and hence with respect to the longitudinal axis "Z-Z" of said transfer device 16. The abovementioned two axes 29, "Z-Z" can be: coinciding, parallel and spaced from each other, tilted with respect to each other and intersecting, tilted and spaced (oblique). Merely by way of example, a calculation method example is reported hereinbelow.

For such purpose, the employed reference system is the clockwise triad "x", "y", "z" which has origin in the centre 31 of the transfer device 16. The axis "z" coincides with the longitudinal axis "Z-Z", the axis "x" is vertical and consequently the axis "y" in FIG. 4 exits from the plane of the drawing.

With reference to FIG. 4, since the distance "Rz" in "z" is known between the sensors 38, 38' and the sensors 40, 40', the distance sensors 38, 40, 38', 40' detect the radial distances R1, R3, $R_1', R_3'$ parallel to the axis "x" which allow calculating, in the plane "x, z", the tilt "ax" and the shift "dx" along "x" between the rotation axis 29 of the auxiliary drum 13 and the longitudinal axis "Z-Z" of the transfer device 16.

Analogously, since the same distance "Rz" in "z" is known between the sensors 39, 39' and the sensors 41, 41', the distance sensors 39, 41, 39', 41' detect the radial distances R2, R4, $R_2', R_4'$ parallel to the axis "y", which allow calculating, in the plane "y, z", the tilt "ay" and the shift "dy" along "y" between the rotation axis 29 of the auxiliary drum 13 and the longitudinal axis "Z-Z" of the transfer device 16.

Such tilts "ax", "ay" and distances "dx", "dy" are used for evaluating the non-coaxiality between the rotation axis 29 of the auxiliary drum 13 and the longitudinal axis "Z-Z" of the transfer device 16.

Figure 5:
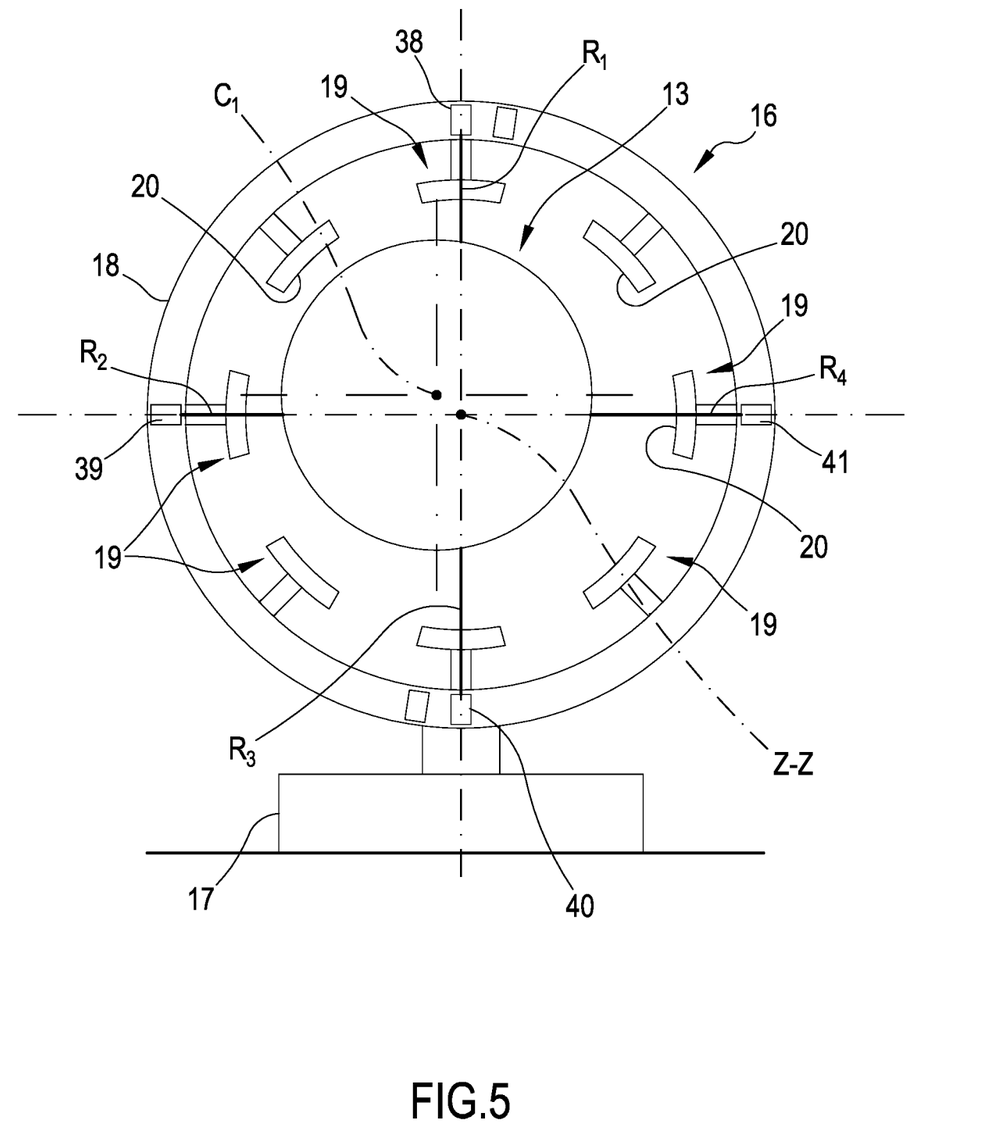
FIG. 5 is a side view of the transfer device associated with the auxiliary drum in the second position of FIG. 4.

According to a calculation variant, the distances R1, R2, R3, R4, $R_1', R_2', R_3', R_4'$ allow calculating, in each of said first plane P1 and second plane P2 in which such distances are measured, a respective first centre "C1" lying on the first plane P1 and a respective second centre "C2" lying on the second plane P2, in which the rotation axis 29 of the auxiliary drum 13 passes through said first and second centres "C1", "C2" (FIGS. 4 and 5). The distances between each of said two centres "C1", "C2" and the longitudinal axis "Z-Z" are used for evaluating the non-coaxiality. In the same manner, the distance sensors 38, 39, 40, 41, 38', 39', 40', 41' with the control unit are capable of detecting the coaxiality between the longitudinal axis "Z-Z" of the transfer device 16 and the rotation axis 26 of the carcass structure 14 and of the forming drum 12. In such case, the radial distances are detected at the radially external surfaces of the carcass structure 14 carried by the forming drum 12 or of the shaft 25.

In a preferred embodiment, the assembly station 1 is capable of generating warning and alarm signals if the centring (intended as coaxiality and/or longitudinal centring) between the auxiliary drum 13 and the transfer device 16 and/or between the forming drum 12 and the transfer device 16 does not fall within predefined thresholds. Such thresholds can be the same for the forming drum 12 and the auxiliary drum 13 or they can even be different.

The control unit can be programmed for generating a first warning signal if the longitudinal shift "ΔZ" exceeds a first threshold of longitudinal shift, e.g. +/−2 mm, and for generating a second alarm signal if the longitudinal shift "ΔZ" exceeds a second threshold of longitudinal shift, greater than the first, e.g. +/−3 mm.

The coaxiality, or non-coaxiality, is for example evaluated as a function of the position of the first centre "C1" with respect to the point of intersection of the longitudinal axis "Z-Z" of the transfer device 16 with the first plane P1 and as a function of the position of the second centre "C2" with respect to a point of intersection of the longitudinal axis "Z-Z" of the transfer device 16 with the second plane P2.

Considering a first radius of a circle with centre in the point of intersection of the longitudinal axis "Z-Z" with the first plane P1 and passing through the first centre "C1" and a second radius of a circle with centre in the point of intersection of the longitudinal axis "Z-Z" with the second plane P2 and passing through the second centre "C2", the control unit can be programmed for generating a second warning signal if the first radius and/or the second radius exceeds/exceed a first threshold of non-coaxiality, e.g. +/−1 mm, and for generating a second alarm signal if the first radius and/or the second radius exceeds/exceed a second threshold of non-coaxiality, greater than the first, e.g. +/−2 mm.

The alarm signals can be followed by the blocking of the building apparatus or of the assembly station 1.

The control unit is also configured for recording the errors of centring (in terms of coaxiality and/or of longitudinal centring) relative to subsequent assemblies of tyres, so as to collect historical data that will serve for the evaluation of the progressive course of the errors and for their correlation with the data relative to the uniformity of the produced tyres.

In a preferred embodiment, the assembly station 1 is capable of feedback correcting the position of the auxiliary drum 13 and/or of the forming drum 12 with respect to the transfer device 16 when said drums 12, 13 are situated within the transfer device 16, so as to always obtain an optimal centring. Such control is carried out by for example resetting the reference coordinates of the movement device 21 and of the auxiliary movement device 22 as a function of the detected errors of mutual positioning (longitudinal centring and/or coaxiality).

For such purpose, the control unit is operatively connected to the measurement device 30 as well as to the auxiliary movement device 22, and is programmed for: receiving, from the measurement device 30, an auxiliary signal relative to a longitudinal shift "ΔZ" of the auxiliary drum 13, calculating, from said auxiliary signal, a first error of longitudinal centring of the auxiliary drum 13 with respect to the transfer device 16, feedback controlling the position of the auxiliary movement device 22, so as to longitudinally centre the auxiliary drum 13 with respect to the transfer device 16.

The control unit is also operatively connected to the movement device 21 and is programmed for: receiving, from the measurement device 30, a signal relative to a longitudinal shift "ΔZ" of the forming drum 12, calculating, from said signal, a second error of longitudinal centring of the forming drum 12 with respect to the transfer device 16, feedback controlling the position of the movement device 21, so as to longitudinally centre the forming drum 12 with respect to the transfer device 16.

The longitudinal centring is intended as achieved if the first and the second longitudinal shift "ΔZ" are cancelled or better yet brought below a reference longitudinal shift equal for example to 1 mm.

The control unit is also programmed for: receiving, from the measurement device 30, distance signals relative to radial distances R1, R2, R3, R4, $R_1'$, $R_2'$, $R_3'$, $R_4'$ from the auxiliary drum 13, calculating from said distance signals the position of the rotation axis 29 of the auxiliary drum 13, feedback controlling the position of the auxiliary movement device 22, so as to render the auxiliary drum 13 and the transfer device 16 coaxial, i.e. to make the longitudinal axis "Z-Z" of the transfer device 16 substantially coincide with the rotation axis 29 of the auxiliary drum 13 and of the crown structure 15.

The control unit is also programmed for: receiving, from the measurement device 30, distance signals relative to radial distances R1, R2, R3, R4, $R_1'$, $R_2'$, $R_3'$, $R_4'$ from the forming drum 12, calculating from said distance signals the position of the rotation axis 26 of the forming drum 12, feedback controlling the position of the movement device 21, so as to render the forming drum 12 and the transfer device 16 coaxial, i.e. in order to make the longitudinal axis "Z-Z" of the transfer device 16 substantially coincide with the rotation axis 26 of the forming drum 12 and of the carcass structure 14.

The coaxiality is intended as achieved if the first radius and the second radius are cancelled or better yet if they are brought below a reference radius, e.g. of 0.5 mm.

The types of drums described in the present description (forming drum and auxiliary drum) are non-limiting. In other embodiments, not described in detail, the transfer device can operate with other types of drums which carry a tyre being processed.

The invention claimed is:

1. A transfer device of an apparatus for building tyres for vehicle wheels, comprising:
    an annular support structure;
    gripping elements arranged as a ring on the annular support structure and having gripping surfaces being directly radially towards a longitudinal axis (Z-Z) of the transfer device, wherein the gripping elements are configured for arrangement around a drum carrying a tyre; and
    a measurement device mounted on the annular support structure;
    wherein the measurement device is configured for detecting a longitudinal shift (ΔZ) along a direction parallel to the longitudinal axis (Z-Z) of the transfer device, between a centre of the transfer device and a centre of the drum,
    wherein the tyre is a carcass structure or a crown structure and the drum is a forming drum or an auxiliary drum,
    wherein the measurement device comprises a sensor mounted on the annular support structure and wherein the sensor is configured for measuring a longitudinal distance, parallel to the longitudinal axis (Z-Z), between a lateral portion of the transfer device and a longitudinal end of the drum,
    wherein the sensor comprises an emitter and a receiver situated in diametrically opposite positions of the annular support structure, and wherein the sensor is configured for generating a beam of electromagnetic waves extended between the emitter and the receiver.

2. The device according to claim 1, wherein the measurement device comprises at least one first group of distance sensors mounted on the annular support structure and configured for measuring radial distances (R1, R2, R3, R4) from a radially external surface of the drum.

3. The device according to claim 1, wherein the measurement device comprises a first group of distance sensors, mounted on a first of two longitudinally opposite lateral portions of the annular support structure, and a second group of distance sensors, mounted on a second of the two longitudinally opposite lateral portions of the annular support structure.

4. The device according to claim 2, wherein each group of distance sensors comprises at least three distance sensors.

5. The device according to claim 4, wherein the distance sensors of each group are angularly equidistant from each other.

6. The device according to claim 3, wherein the first and the second group of distance sensors are situated on planes symmetric with respect to a middle line plane of the transfer device.

7. The device according to claim 3, wherein each of the distance sensors are sensitive to electromagnetic waves.

8. An apparatus for building tyres for vehicle wheels, comprising:
- a forming drum configured for carrying a carcass structure; an auxiliary drum configured for carrying a crown structure; a movement device with at least two degrees of freedom configured for supporting the forming drum;
- an auxiliary movement device with at least two degrees of freedom configured for supporting the auxiliary drum;
- a transfer device according to claim 1; and
- wherein the movement device is movable between a first position in which the forming drum is in a radially internal position with respect to the gripping elements of the transfer device and a second position in which the forming drum is outside the transfer device; and
- wherein the auxiliary movement device is movable between a first position in which the auxiliary drum is in a radially internal position with respect to the gripping elements of the transfer device and a second position in which the auxiliary drum is outside the transfer device.

* * * * *